United States Patent
Rahmouni et al.

(10) Patent No.: US 8,156,063 B1
(45) Date of Patent: Apr. 10, 2012

(54) DECISION MAKING BASED ON CHANGES INPUT TO A DATABASE

(75) Inventors: Maher Rahmouni, Bristol (GB); David M. Trastour, Bristol (GB); Dennis K. Clemmer, Chagrin Falls, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 12/240,593

(22) Filed: Sep. 29, 2008

Related U.S. Application Data

(60) Provisional application No. 61/046,679, filed on Apr. 21, 2008.

(51) Int. Cl.
*G06F 17/00* (2006.01)
*G06N 5/00* (2006.01)

(52) U.S. Cl. ............. 706/45; 706/46; 706/47; 706/48; 706/62; 707/600; 707/603

(58) Field of Classification Search .................. None
See application file for complete search history.

(56) References Cited

U.S. PATENT DOCUMENTS

| | | | | |
|---|---|---|---|---|
| 7,707,015 | B2 * | 4/2010 | Lubrecht et al. | 703/6 |
| 7,949,628 | B1 * | 5/2011 | Blazek et al. | 707/600 |
| 2006/0070033 | A1 * | 3/2006 | Care et al. | 717/124 |
| 2007/0100892 | A1 * | 5/2007 | Kephart et al. | 707/200 |
| 2007/0299702 | A1 * | 12/2007 | Rigdon et al. | 705/7 |
| 2008/0097626 | A1 * | 4/2008 | Reed et al. | 700/30 |

OTHER PUBLICATIONS

Graves et al. "Predicting fault incidence using software change history", IEEE transactions on software engineering, 2000, pp. 653-661.*
Chinneck, J.W., "Fast Heuristics for the Maximum Feasible Subsystem Problem", INFORMS Journal on Computing, vol. 13, No. 3, pp. 210-223, 2001.

* cited by examiner

*Primary Examiner* — Omar Fernandez Rivas

(57) ABSTRACT

An assessment of a request for change is made by first receiving the request for change. The request for change is compared with a plurality of stored requests for change that are stored in a change database. Then, a computation is made, using learned similarity functions, of a similarity value for each of the stored requests for change with respect to the received request for change. Feedback is received with respect to the similarity values. A training set of data is updated based on the received feedback. The updated training set of data is applied to a learning process, to obtain learned similarity functions. The similarity calculator is updated with the learned similarity functions. The similarity functions can be used to evaluate the risk of changes by looking at the impact of similar past changes.

28 Claims, 9 Drawing Sheets

Figure 2

| Attributes | Description | Type |
|---|---|---|
| Description | This is a summary description of the change | Text |
| CIs to be Changed | List of CIs | Set |
| Affected Applications | List of applications affected and their topology | Tree or a graph |
| Change Implementer(s) | Who will implement the change (a single person or a group) | Object or Set of objects |

Figure 3

```
Loop through all existing similarity functions S_r
    Add new( remaining ) training elements to the group represented by S_r
    Solve the corresponding linear problem
    If the problem is infeasible then
        remove the training elements causing the infeasibility of the problem
        from the group until the problem becomes feasible
    Update the similarity function S_r
End Loop If there are remaining training elements then
    Loop until there are no remaining training elements
        Create a new similarity function S_r
        Add remaining training elements to the group represented by S_r
        Solve the corresponding linear problem
        If the problem is infeasible then
            remove the training elements causing the infeasibility of the problem
            from the group until the problem becomes feasible
        Update the similarity function S_r
    End Loop
```

Figure 4

INPUT: Original infeasible Linear Program (P2)

STEP1:
CoverSet = φ
Elasticize P2 into EP2
Solve EP2

STEP2:
If the number of constraints with non zero elastic variable = 1, then:
    Add corresponding constraint to Coverset
    Goto STEP3
Else
    Remove the constraint with the highest product (elastic variable * constraint sensitivity) from EP2
    Add corresponding constraint to CoverSet
Solve EP2
If objective function = 0, then:
    Goto STEP3
Goto STEP2

STEP3:
Remove all constraints in Coverset from P2
Solve P2

OUTPUT: Similarity function represented by (w1,..., wn) and threshold t

Figure 5

| Training Element | Changes | Expert Feedback | Attribute 0 Similarity | Attribute 1 Similarity | Attribute 2 Similarity | Attribute 4 Similarity |
|---|---|---|---|---|---|---|
| t0 | c1, c2 | True | 0.75 | 0.12 | 0.89 | 0.3 |
| t1 | c3, c4 | True | 0.88 | 0.2 | 0.73 | 0.15 |
| t2 | c5, c6 | True | 0.05 | 0.92 | 0.11 | 0.77 |
| t3 | c7, c8 | True | 0.1 | 0.72 | 023 | 0.88 |
| t4 | c9, c10 | False | 1 | 0.7 | 0.03 | 0.2 |
| t5 | c11, c12 | False | 0.09 | 0.8 | 0.77 | 0.14 |

Figure 6

| Training Element | Changes | f1 | f2 |
|---|---|---|---|
| t0 | c1, c2 | - | 0.81 |
| t1 | c3, c4 | - | 0.81 |
| t2 | c5, c6 | 0.82 | - |
| t3 | c7, c8 | 0.82 | - |
| t4 | c9, c10 | 0.37 | 0.56 |
| t5 | c11, c12 | 0.37 | 0.56 |

INPUT: Training Set
LOOP
   Apply the algorithm in Figure 4 onto the Training Set
   Remaining Positive Elements = Coverset;
   Training Set = Negative Elemetns + Remaining Positive Elements
Until (Remaining Positive Elements = φ or no new function can be learned)

OUTPUT: All similarity functions

DECISION MAKING BASED ON CHANGES INPUT TO A DATABASE

CROSS REFERENCE TO RELATED APPLICATIONS

This Application claims the benefit of provisional patent application Ser. No. 61/046,679, filed Apr. 21, 2008, titled "DECISION MAKING BASED ON CHANGES INPUT TO A DATABASE," which application is incorporated by reference herein as if reproduced in full below.

FIELD OF THE INVENTION

This invention is related in general to the field of data evaluation. This invention relates more particularly to performing decision making based on inputs to a database, and in particular, to an Information Technology (IT) database.

BACKGROUND OF THE INVENTION

IT environments are becoming increasingly complex and dynamic. Changes are constantly introduced responding to changing business needs such as improving services or reducing costs, as well as solving existing incidents or problems. A typical enterprise deals with hundreds of thousands of changes every year. For these reasons, a disciplined process is needed to ensure that required changes are carried out in a planned and authorized manner while minimizing the impact and risk of those changes upon service quality.

There are several activities involved in managing an individual change. It starts by creating and submitting a request for change (RFC). The RFC gets reviewed, assessed, and eventually authorized or rejected. Once the RFC is authorized, plans are created including implementation plans, test plans and back out plans in case the change fails. Then, the change is built, tested and implemented. Finally, the change is reviewed to ensure that the change has the desired effect and met the required objectives.

Following the Information Technology Infrastructure Library (ITIL) set of best practices, during the lifecycle of a change, information is collected and knowledge is created and stored in a configuration management database (CMDB). A CMDB contains details of organization elements referred to as Configuration Items (CIs). CIs are used in the provision and management of IT services. A CMDB contains information about all changes that have been performed on the organization elements. For example, the CMDB includes the plans for implementing those changes, the risks involved, any back-up plans, the resources used, the impacted applications, the incidents triggered by implementing those changes, whether or not a change has been successfully implemented, the reason or reasons why a change failed, and so on.

Since knowledge is created during the lifetime of a change, it is of paramount importance to the success of the business to re-use that knowledge for future changes. In fact, those who do not learn from past experiences are doomed to repeat the same mistakes and also would not bear the fruit of the ones that were successful. What if a change manager is presented with the outcomes of the most similar changes? He or she will be able to better assess the risk and impact associated with the change at hand and consequently take the appropriate course of action. What if a change planner is presented with the plans of the most similar changes? He or show will be able to learn from those plans and produce plans in a shorter time period with a lower risk of failing. What if a change reviewer is presented with applications that were disrupted by past changes similar to a recently completed change request? He or she will be able to identify it as a potential root cause to newly created incidents.

In order to provide such past outcomes, plans and disrupted applications to a change review, one needs to be able to, given a change, find the most similar past changes and display them. The information contained in a change record includes various attribute types, ranging from complex types such as text documents or graph representations, to basic types such as strings, integers and booleans. Conventional techniques exist for computing similarities of such attributes, but such conventional techniques suffer from inadequate similarity computations.

There is a desire, as determined by the inventors of this application, to come up with a solution that identifies and learns similarity between objects combining different types of attributes, to thereby provide an enhanced decision support tool for IT.

SUMMARY OF THE INVENTION

The present invention relates to a method and apparatus for providing an enhanced decision support tool for IT.

In accordance with one aspect of the invention, there is provided a method for assessing a request for change. The method includes receiving the request for change. The method also includes comparing the request for change with a plurality of stored requests for change that are stored in a change database. The method further includes computing, using a similarity function, a similarity value for each of the stored requests for change with respect to the received request for change. The method still further includes receiving feedback with respect to the similarity values. The method also includes updating a training set of data based on the received feedback. The method further includes applying the updated training set of data to a learning process, to obtain learned similarity functions. The method still further includes updating the similarity calculator to use the newly learned similarity functions.

In accordance with another aspect of the invention, there is provided a system for assessing a request for change. The system includes a first input unit configured to receive the request for change. The system also includes a change database configured to store a plurality of requests for change that have been previously received by the system. The system further includes a similarity calculator unit configured to compare the request for change with the plurality of stored requests for change, and to compute and output, using a set of similarity functions, a similarity value for each of the plurality of stored requests for change with respect to the received request for change (whereby each respective similarity value obtained is the maximum of the similarity values outputted by the set of similarity functions). The system still further includes a second input unit configured to receive feedback with respect to the similarity values output by the similarity calculator unit. The system also includes an updating unit configured to update a training set of data based on the received feedback. The system further includes a learning unit configured to apply a learning process to the updated training set of data and to obtain learned similarity functions. The similarity functions used by the similarity calculator unit are updated to perform calculations using the newly learned similarity functions.

In accordance with yet another aspect of the invention, there is provided a method of determining an impact associated with a new change. The method includes receiving a change to be implemented in a system. The method also includes calculating a correlation k(c,p) for all pairs of: a) the received change, and b) a plurality of pairs of changes and problem records associated therewith that are stored in a storage unit. The method further includes measuring a similarity between the received change and each of the stored changes. The method still further includes calculating an impact associated with implementing the change based on the similarities measured in the measuring step.

In accordance with still yet another aspect of the invention, there is provided a system for determining an impact associated with a new change. The system includes an input unit configured to receive a change to be implemented in the system. The system also includes a storage unit configured to store a plurality of pairs of changes and problem records associated therewith. The system further includes a calculating unit configured to calculate a correlation k(c,p) for all pairs of: a) the received change, and b) the plurality of pairs of changes and problem records associated therewith that are stored in the storage unit. The system still further includes a similarity measuring unit configured to measure a similarity between the received change and each of the changes stored in the storage unit. The system also includes a calculating unit configured to calculate an impact associated with implementing the change based on the similarities measured by the similarity measuring unit.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 is a diagram showing a set of attributes used to model a Request for Change (RFC) as an object according to the first embodiment.

FIG. 3 shows code that can be used to implement a learning feature according to the first embodiment.

FIG. 4 depicts an algorithm that may be used for finding an MSFP according to the first embodiment.

FIG. 5 shows a test case utilized to test the efficacy of the first embodiment.

FIG. 6 shows the calculated similarities for all training elements using the functions f1 and f2, according to the first embodiment.

DETAILED DESCRIPTION

Reference will now be made in detail to embodiments of the invention, examples of which are illustrated in the accompanying drawings. An effort has been made to use the same reference numbers throughout the drawings to refer to the same or like parts.

Unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

Figure 1:
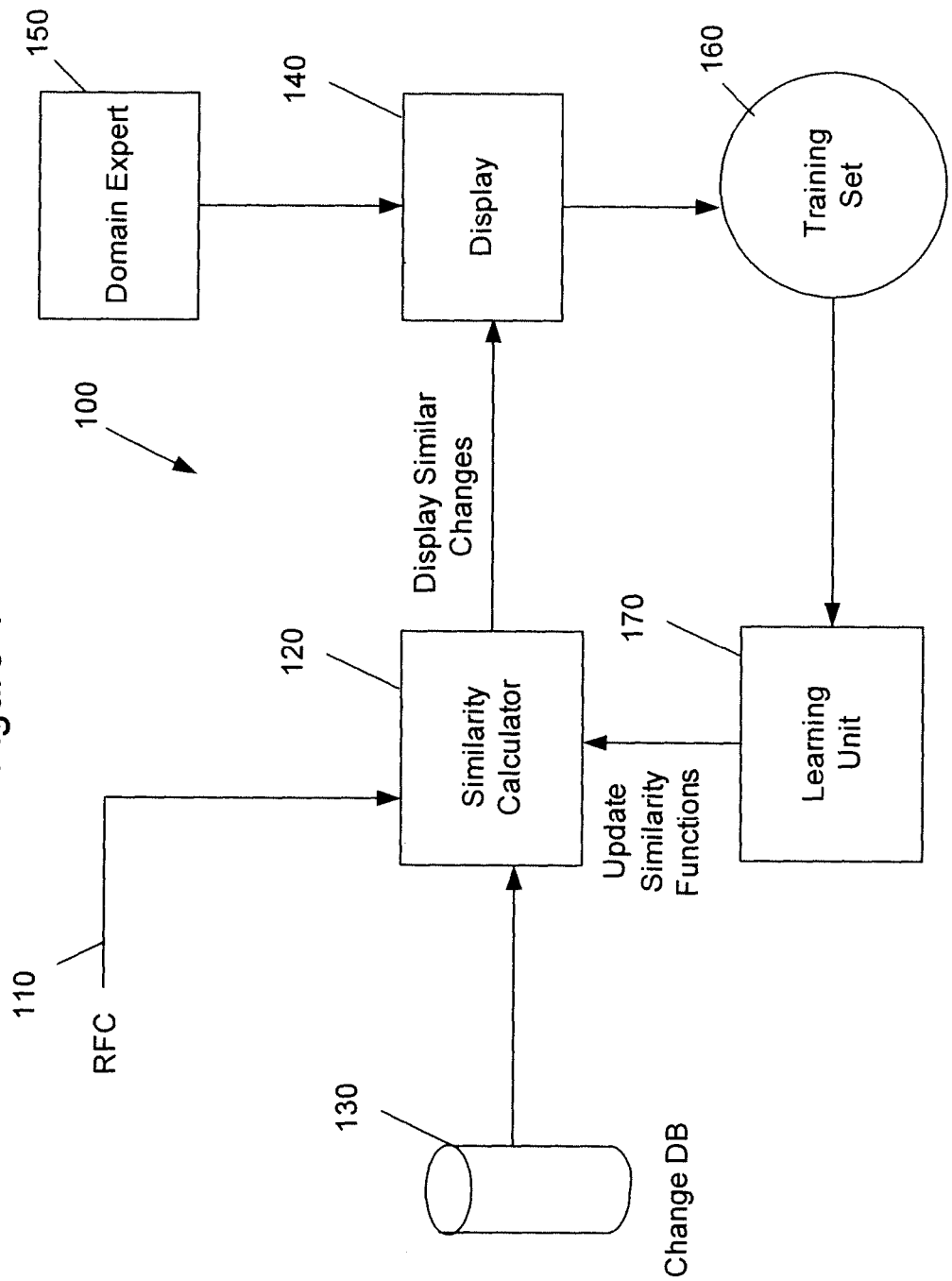
FIG. 1 is a block diagram showing elements making up a decision support system according to a first embodiment.

FIG. 1 shows an enhanced decision support system 100 according to a first embodiment of the invention. When a Request for a Change (RFC) 110 is received by the system 100, a Similarity Calculator 120 compares it to changes stored in a Change Knowledge Base (CKB) 130. The CKB 130 is a database that stores the set of all changes performed in the past.

The comparison of the newly-received RFC 110 with a particular change as performed by the Similarity Calculator 120 makes use of a similarity function that will be described in more detail herein below. The output of the Similarity Calculator 120 is a listing of the most similar changes stored in the CKB 130, such as the 10 most similar changes. Those most similar changes are displayed to the user on a Display 140, along with a measure of how similar the change is (as determined by the Similarity Calculator 120). The measure is preferably a numeric value between 0 and 1, whereby 1 corresponds to 'exactly similar', and whereby 0 corresponds to 'not similar at all.'

Based on the output on the Display 140, a Domain Expert 150 provides expert feedback as to whether or not the displayed changes are genuinely similar to the RFC 110 that was recently input to the system 100. This feedback includes an indication as to whether the two changes are similar or not (e.g., 0 signifies not similar, 1 signifies similar, or vice versa). Once the expert feedback has been entered and recorded onto the Display 140, a set of new training elements is created and added to the training elements stored in the Training Set 160. A training element is an object representing the actual RFC 110, a change determined to be similar according to the similarity function, along with the expert feedback.

In the first embodiment, the training elements are added to the Training Set 160 only if there is at least one change deemed to be similar according to the comparison made by the Similarity Calculator 130, but whereby that at least one change is not deemed to be similar according to the expert feedback provided by the expert. In the first embodiment, the set of training elements stored in the Training Set 160 corresponds to all feedback provided by the Domain Expert 150.

The expert feedback is provided by a person who preferably is highly experienced in IT Configuration data and in the system at hand, to allow that person to make determinations and to provide them as similarity feedback values.

The training elements stored in the Training Set 160 are updated with the new set of training elements, due to the fact that the Similarity Calculator 120 inaccurately determined a high similarity between the RCF 110 and one or more changes obtained from the CKB 130. Because of this, there is a need to learn new similarity functions using the expert feedback, thereby resulting in the new set of training elements being added to the Training Set 160. Once new similar functions are learned, they are then used for future detection of similarities between the RFC 110 and similar changes stored in the CKB 130.

Description will now be made of a similarity calculation as performed by the Similarity Calculator 130. An RFC is modeled as an object with a set of attributes as shown in FIG. 2. Those attributes include "description", "CIs to be changed", "affected applications", and "change implementor(s)." Of course, one of ordinary skill in the art will recognize that other attributes can be added to an object that is used to model an RFC (and one or more of the attributes shown in FIG. 2 can be deleted), while remaining within the spirit and scope of the invention.

FIG. 2 also shows that a "description" field is provided for each attribute of the object, and a "type" field is also provided for each attribute of the object. Depending on the type of the attribute, an appropriate similarity function is utilized based on a pre-defined distance (similarity and distance notations are dual), to calculate a similarity between the same attributes of different RFCs, as performed by the Similarity Calculator 120. For example, for a vector of an "integer" type, a similarity function can be used based on the Euclidian distance. For strings of the same length, a similarity function based on a Hamming distance can be used. For strings of different length, a similarity function based on a Levenshtein distance is more suitable than a Hamming distance and can be used to determine similarities.

In the first embodiment, a modified version of the Levenshtein distance is used to calculate similarity between a set of objects. For text documents, a cosine similarity is deemed to be the most appropriate, and is utilized for such types. For comparing two RFC objects, a similarity function is defined that represents the weighted sum of the similarities between the respective attributes of the two RFC objects, in order to determine a composite similarity between the two RFC objects. This computation is performed by the Similarity Calculator 120.

The root of the cosine similarity measure comes from vector analysis theory. The cosine angle between two vectors represents how close those vectors are. In other words, the closer the two vectors are, the more the cosine of the angle approaches one. The cosine angle between two vectors is represented by the ratio between their dot product and their Euclidean distance. To apply this approach to compare text documents in a collection, the latter are represented as term vectors where the coordinates of the vector are the term weights. There are many ways to represent a term weight, whereby the most widely used weight is tf*log(N/n), whereby tf is the term frequency, N is the total number of text documents in the collection, and n is the number of documents containing the term. The cosine similarity is used in many search engines to rank text documents with respect to a given query.

The Levenshtein distance, also referred to as the edit distance, has been widely used to measure similarity between strings. This distance is computed as the number of edits (insertions, deletions, and substitutions) needed to transform a string A into a string B. There are many applications to this measure including spell checking, to identify duplicated content and plagiarism, for spam stemming and spamdexing search engines, regular expressions approximate matching and many others. While it has been mainly used for strings, it can also be used to calculate the similarity between a set of objects or even trees. Since strings are ordered characters, if one considers objects or tree nodes as characters and defines an order for the set of objects or a traversal order on trees, then it is fairly straightforward to apply this measure to compare two different sets of objects or two trees.

As stated herein above, there is a duality between similarity and distance. A similarity can be modeled as a function $S=f(d)$, where:

$f(0)=1$, meaning that two objects are similar if their distance is equal to zero (0).

If $d1<=d2$, then $f(d1)>=f(d2)$, meaning that the closer the distance of two objects, the more similar they are.

Unfortunately, there are many functions that could satisfy the above properties, and the choice of a good function depends on the problem at hand. Functions that can be used include:

$$S=1/(1+d);$$

$$S=\exp(-d/2);$$

$$S=1-d/M \text{ for } d<M, 0 \text{ otherwise.}$$

The learning process corresponds to finding at least a similarity function Sij and a threshold t that maximizes the number of training elements set correctly. Such a weighted sum similarity function that can be used by the Similarity Calculator 120 according to the first embodiment is provided below as equation (1):

$$S_{ij}=\Sigma_k w_k S_{ijk} \qquad (1),$$

where:

$S_{ij}$ defines the similarity between $RFC_i$ and $RFC_j$;

$w_k$ is the weight associated to attribute k of an RFC; and $S_{ijk}$ is the similarity between the $k^{th}$ attributes of $RFC_i$ and $RFC_j$.

Computing the threshold t is linked to computing each similarity function. For example, with reference to the algorithm shown in FIG. 4, the output of the algorithm is a similarity function Sij (represented by $w_1, \ldots, w_n$) and a threshold t.

The values of the weights $w_k$ represent the significance of the corresponding attributes in determining the similarity between RFCs. Two RFCs ($RFC_i$ and $RFC_j$) are considered to be similar if their similarity value is greater than or equal to the computed threshold t. While the first embodiment is described with respect to one similarity function, in an alternate implementation of the first embodiment there may also be more than one similarity function utilized, whereby each of the plural similarity functions has the same linear form as described herein above, and whereby the only difference between the plural similarity functions are the weights applied to each of the similarity functions.

The data stored in the Training Set 160 is utilized by a Learning Unit 170, so as to provide an updated similarity function or functions to be used by the Similarity Calculator 120 for future similarity computations between an input RFC 110 and RFCs stored in the CKB 130. The Learning Unit 170 performs learning in the first embodiment in the manner as described herein below.

The Learning Unit 170 performs a learning process that is modeled as a clustering problem in which all training elements are grouped around different similarity functions. A training element ($RFC_i$, $RFC_j$, ($S_{ij1}, \ldots, S_{ijn}$), f) is added to a group represented by a similarity function $S_r$ only if the following equations have a feasible solution:

$$\Sigma_k w_k = 1 \qquad (2)$$

$$0 < w_k < 1 \qquad (3)$$

For each training element (i,j) in the group:

If f is true, then $S_{r,ij} \geq t_r$ (where $t_r$ is the threshold value computed for similarity function $S_r$)

If f is false, then $S_{r,ij} < t_r$.

Assuming that the above equations have a feasible solution, then a training element is added to a particular group of elements, and a corresponding similarity function is updated, to be used by the Similarity Calculator 120 for all future similarity calculations to be performed by that unit. FIG. 3 shows one possible pseudo-code implementation of a learning process that is performed by the Learning Unit 170, in accordance with the first embodiment. The learning process shown in FIG. 3 is envisioned to be used in an on-line, live system, and provides a dynamic learning process.

The learning process can be modeled as a Mixed Integer Program (MIP) in one possible implementation of the first embodiment. The MIP corresponds to:

(P1): Maximize the number of training elements set correctly

Max $\Sigma u_c$ (for c=1 to m), such that:

$u_c$=1 if training element c is set correctly, 0 otherwise.
A training element $RFC_i$, $RFC_j$, $(S_{ij1}, \ldots, S_{ijn})$, f) is considered to be set correctly if and only if:

if f is true, then $S_{ij}-t>=0$;
if f is false, then $S_{ij}-t<0$.

$\Sigma w_k = 1$ (for $k=1$ to $n$), $0 < w_k \leq 1$.

The above problem is known as the maximum feasible subsystem solution (MFSP). Unfortunately, this problem is known to be NP-hard, and hence finding an optimal solution for a large training set is out of reach. However, there are several fast heuristics that can be used to solve the MFSP problem, producing results covering more than 90% of the optimal set of feasible constraints in polynomial time. FIG. 4 depicts an algorithm that may be used for finding the MSFP according to the first embodiment, whereby that algorithm can be described as follows. This algorithm is described by John W. Chinneck, in an article entitled "Fast Heuristics for the Maximum Feasible Subsystem Problem", INFORMS Journal on Computing, vol. 13, no. 3, pp. 210-223, 2001.

In step 1, transform P1 into a linear program P2. Contrary to an MIP, a linear problem can be solved in polynomial time.

(P2): Max t such that:

$\Sigma w_k = 1$ (for $k=1$ to $n$), $0 < w_k \leq 1$.

For each training element:
if f is true, then $S_{ij}-t>=0$;
if f is false, then $S_{ij}-t<0$.

In step 2, elastize P2 into EP2. An elastic program is a relaxation of an LP by adding/subtracting (depending on the direction of the inequality) non-negative elastic variables of the constraints. By design, an elastic program is always feasible. An elastic program has the advantage of providing useful information about the infeasibility of the original LP. The objective function of the elastic program is to minimize the sum of the elastic variables. If the value of the objective function is equal to zero (0), then the original LP (P2) is feasible. The value of the elastic variable indicates whether the corresponding constraint is violated (value equal to 0) or not (value not equal to 0).

(EP2): Min $\Sigma e_c$ (c=1 to m) such that:

$\Sigma w_k = 1$ (for $k=1$ to $n$), $0 < w_k \leq 1$.

For each training element:
if f is true, then $S_{ij}-t+e_c>=0$;
if f is false, then $S_{ij}-t-e_c<0$;
$e_c>=0$ The third and last step corresponds to iterating through a process of deleting a constraint from the elastic program until the original LP (P2) becomes feasible. The choice of the constraint depends on the impact of its deletion on the drop on the objective function. It has been determined that a good predictor of the magnitude of the drop in the objective function that will be obtained by deleting the constraint is given by the product (constraint violation)×(constraint sensitivity), where the constraint violation represents the value of the elastic variable and the constraint sensitivity is the reduced cost of the variable associated to the constraint (value of the dual variable of the constraint).

While the learning algorithm described above produces good results in solving the MSFP problem, it does not cover a big part of the training set. This drawback is mainly due to the nature of the problem at hand, meaning that one similarity function is not sufficient to cover all cases of similarities in the training set. The following example illustrates this issue. Assume that a change is composed of four (4) attributes and the training set corresponds to the six elements shown in FIG. 5. Then, each training element corresponds to a couple of changes (ci, cj), the user feedback (true/false) stating whether or not the two changes are similar, and the similarity of the attributes of both changes. From this example, one can see that t0 and t1 share high similarities for attributes a0 and a2, while t2 and t3 share high similarities for attributes a1 and a3. Training elements t4 and t5 state that two changes having high similarity for attributes (a0, a1) respectively (a1, a2) are not similar. Furthermore, one can see that any MSFP would contain either t0 and t1 or t2 and t3, but not both. If one applies the algorithm shown in FIG. 4 over this training set, it will eliminate t0 and t1 (as the corresponding constraints were causing the infeasibility of the system) and produces a similarity function f1 represented by (w1, w2, w3, w4)=(0, 0.35, 0, 0.65), and a threshold t=0.82.

Continuing with the above example, if one constructs a new training set composed of t0, t1 (positive elements excluded by applying the algorithm on the whole training set) as well as the negative elements t4, t5, then by applying the same algorithm, one obtains a similarity function f2 represented by (w1, w2, w3, w4)=(0.55, 0, 0.45, 0), and a threshold t=0.81. The negative elements t4 and t5 have been added to the training set to make sure that every similarity function will exclude all negative elements from being classified as similar. FIG. 6 shows the calculated similarities for all training elements using the functions f1 and f2.

Figure 7:
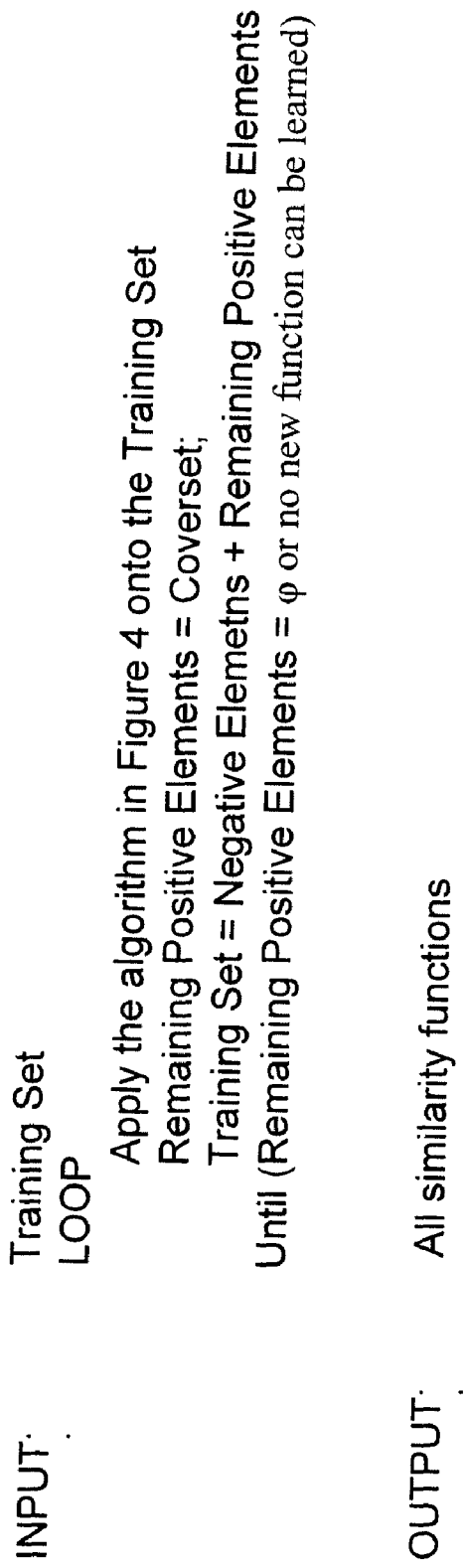
FIG. 7 shows pseudo code of a modified algorithm that may be used to learn multiple similarity functions, according to the first embodiment.

Accordingly, based on the above limitations, a new algorithm as developed by the inventors of this application for learning multiple similarity functions is provided, and is shown in FIG. 7. The algorithm shown in FIG. 7 is used to generate (learn) initial similarity functions, and is a static process. At each iteration of the algorithm, a new similarity function is created by applying the above-described algorithm onto the training set. The training set is composed of all negative elements and the remaining positive elements (all positive elements whose corresponding constraints have been identified as violated). The algorithm shown in FIG. 7 stops when there are no remaining positive elements or the MSFP contains only negative training elements.

By utilizing a system and method according to the first embodiment, the risk of failure of implementing new changes based on an RFC can be reduced from conventional procedures by the providing of information such as:
1) in the past, similar changes have resulted in a W % success rate (whereby W is a numeric value between 0 and 100); and
2) for similar past changes, the following applications were impacted: X, Y, Z (whereby X, Y and Z denote different applications).

The above information can readily be obtained from displaying the attributes of the similar RFCs to the input RFC 110, which are obtained by utilizing the system and method according to the first embodiment.

Furthermore, the first embodiment facilitates and accelerates the design of changes by re-using existing plans, where applicable. Also, the first embodiment can be readily generalized to use in incident and problem management systems and methods.

A second embodiment of the invention will now be described herein below. The second embodiment has been developed based on the knowledge that IT changes are performed to add functionality to a business service or to rectify an underlying IT problem; however, even after careful testing, changes may also introduce extra problems that did not exist previously. The second embodiment addresses this potential problem by assessing the risk of performing a new change by looking at the history of past changes and problems, and by listing the changes that are most similar and to the latest IT change to be implemented and that had the most impact. This historical information can then be used to decide the amount of testing that is required for the latest IT change to be implemented, the resources that have to be allocated for the latest IT change to be implemented, and the time required to perform back-out plans as a result of implementing the latest IT change. The IT change may correspond to a software change (e.g., change to a different software application) or a hardware change (e.g., use a different type of computer modem for a network of computers), or both.

As background to the development of the second embodiment, IT changes are constantly introduced to meet business needs and to rectify technical problems. Because of the complex dependencies between IT components, IT changes are recorded, approved, and coordinated by a Change Management (CM) process. Even with such CM procedures, because of the difficulty of testing all possible cases of because of lack of required resources to perform various tests, some changes introduce new problems into an IT environment.

The second embodiment addresses the issue of new problems that may be introduced into an IT environment by estimating the technical risk associated with a new IT change to be implemented. Based on a review of historical information with respect to changes and problems associated with previous IT changes that have been implemented, a causal link is established between IT changes and problems. By using a notion of change similarity as described in the first embodiment, an estimate is then made of the risk of performing a new IT change by providing a ranked list of past IT changes that are the most similar to the new IT change to be implemented, whereby the list of past IT changes can be ranked based on the level of impact created by each of the items on that list.

Conventional IT service management solutions track the link from problems to changes, e.g., which changes have been implemented to resolve a problem. However, conventional IT service management solutions do not attempt to understand which changes have caused which problems. The second embodiment attempts to do just that.

Figure 8:
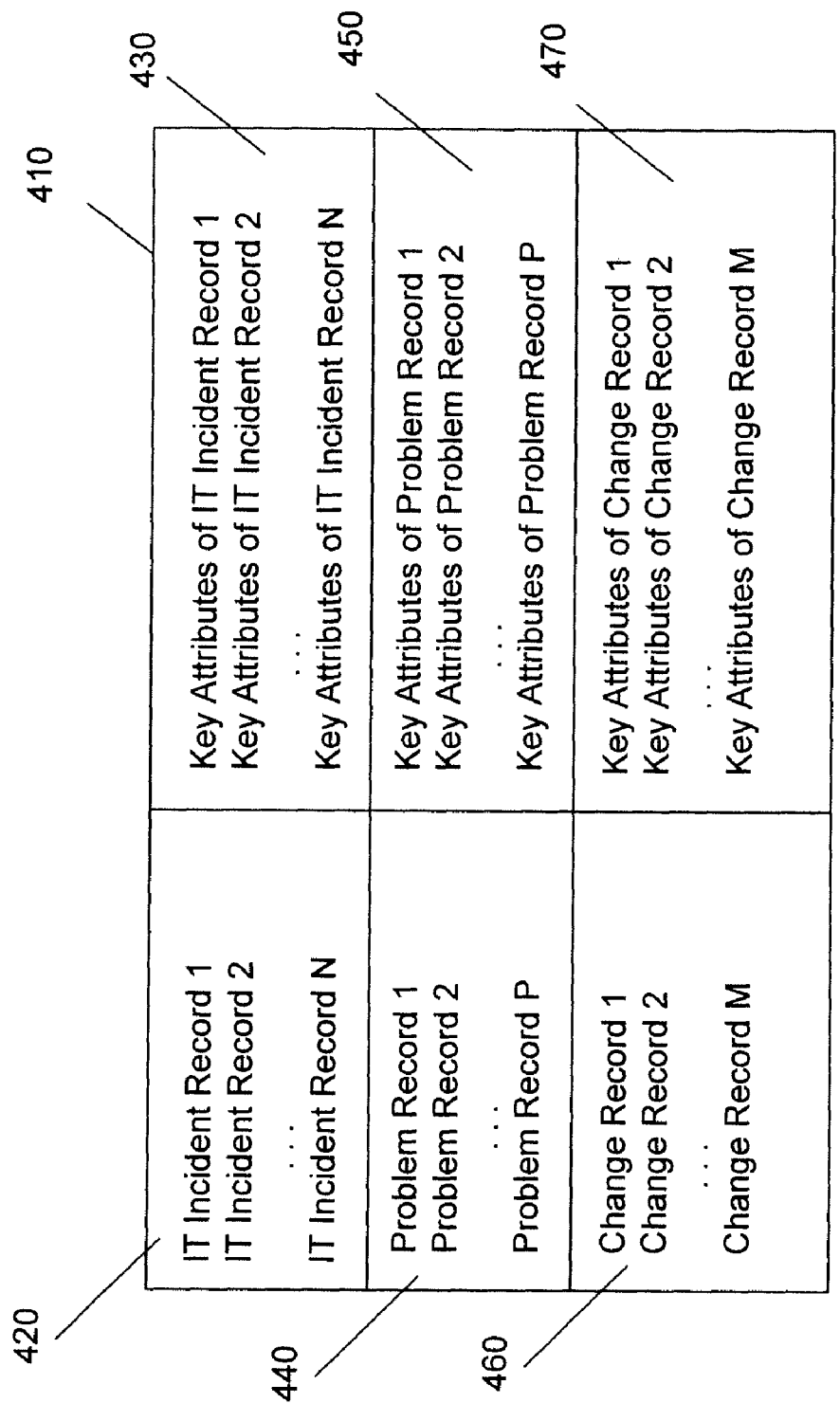
FIG. 8 shows records and related data stored in a storage unit of a system according to a second embodiment.

In the second embodiment, a storage unit stores IT incident records, problem records, and change records, along with key attributes that characterize those records. This can be seen in FIG. 8, whereby a storage unit 410 stores IT incident records 420 having corresponding key attributes 430, problem records 440 having corresponding key attributes 450, and change records 460 having corresponding key attributes 470.

For each of the IT incident records 420, the time that the incident occurred is captured and stored as one of its associated key attributes 430, the resolution time is also stored as another of its associated key attributes 430, and the associated business service for each respective IT incident record is stored as yet another of its associated key attributes 430. Similarly, for each problem record 440, one attribute 450 is the problem start time, another attribute 450 is the resolution time, and yet another attribute is the problem record's 440 association to a configuration item, whereby that configuration item can be linked to one or more IT incident records 420. Lastly, for each change record 460, one attribute 470 associate therewith is an implementation time, and another attribute associated therewith is an association to a configuration item.

Figure 9:
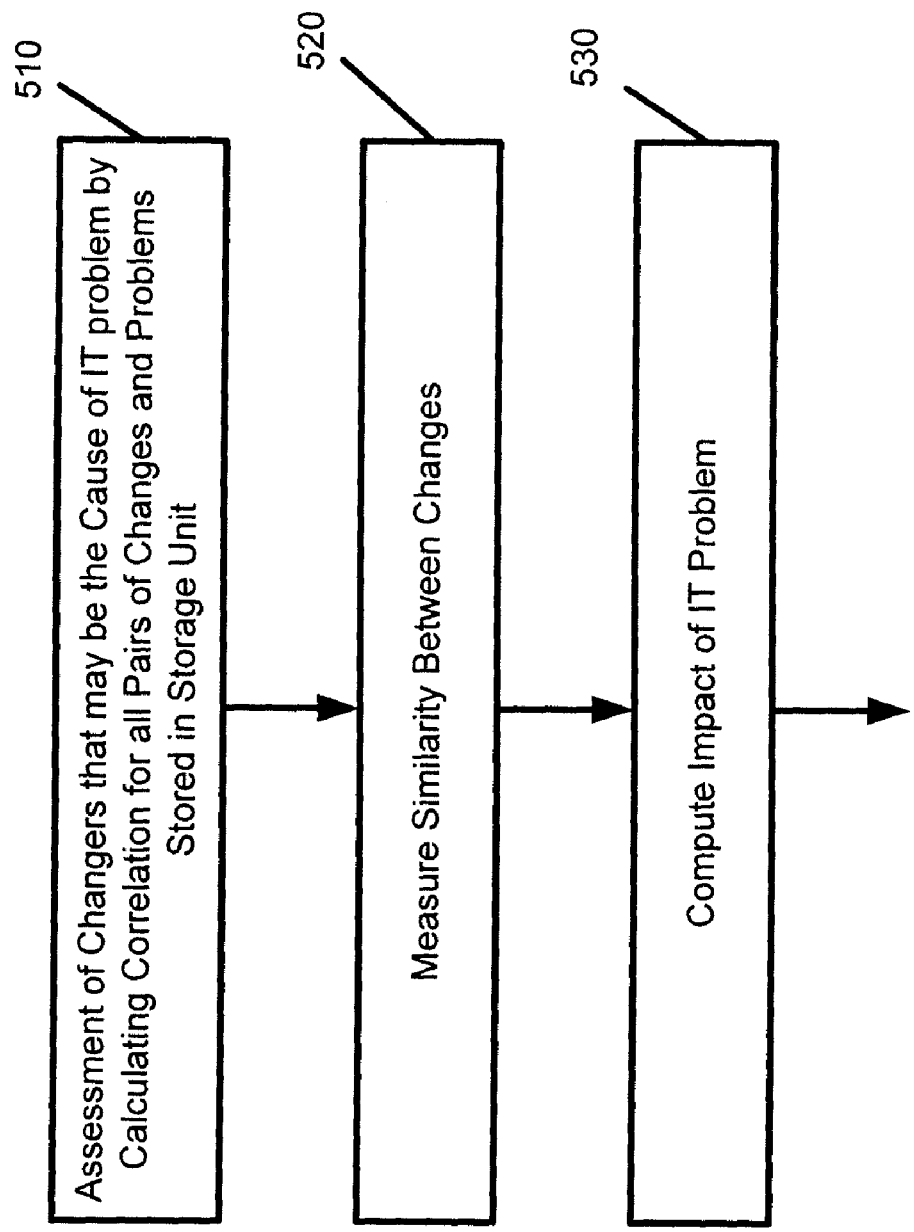
FIG. 9 is a flow chart showing steps involved in a method according to the second embodiment.

A method according to the second embodiment is shown in the flow chart of FIG. 9. In a first step 510, an assessment is made as to what changes may be the cause of an IT problem. To perform this assessment, a correlation k(c,p) is defined between a change and a problem as the product of the similarity between their associated records s(c,p) and a decay(c, p).

As in the first embodiment, the similarity s(c,p) is computed as the weighted sum of the similarities between the various common attributes of the change and problem records. For instance, the similarity is computed between the summary, description, configuration item, and start/resolution date attributes of a change record X and a problem record Y. The weights for each attribute can be set manually, or automatically determined through the learning process described in the first embodiment.

The inventors of this application have determined that, as the time difference between the implementation of a change and the detection of a problem increases, the likelihood that the change and the problem are related decreases. Accordingly, there is defined a likelihood that a change will create a problem at time t as a probability distribution (e.g., an exponential probability distribution). The decay d(c,p) is defined as the value of this distribution at the time the problem is opened (or at the time of the earliest incident opened that is linked to this problem).

In the first step 510 of the second embodiment, a correlation k(c,p) is calculated for all pairs of change and problems that exist in the service management historical data stored in the storage unit 410, which is used to assess what changes may be the cause of an IT problem. In a second step 520, the present invention according to the second embodiment measures a similarity between two changes $s(c_1,c_2)$ (see description above), and as such, an impact of an incident can be calculated. An impact of an IT problem i(p) is then computed in a third step 530 as the sum of the impacts of its associated incidents.

Given a new change $c_{new}$, the second embodiment provides to the user the past changes that are similar to the new change $c_{new}$, and that had the most negative impact. In one possible implementation, the present invention according to the second embodiment ranks all pairs of problems p and past changes c by decreasing order of $s(c_{new}, c) \times k(c, p) \times i(p)$, and provides such a ranking on a display to be viewed by the user. That way, the user can decide whether or not to implement the new change $c_{new}$, or some alternative change.

The present invention according to the second embodiment provides a systematic and automated way of estimating the risk of new changes, and thereby improves the change design process. It allows one to make a more informed decision in change design and implementation, such and when assigning resources, when assessing the amount of testing that is required, and when assessing the amount of time necessary for back-out plans.

Figure 10:
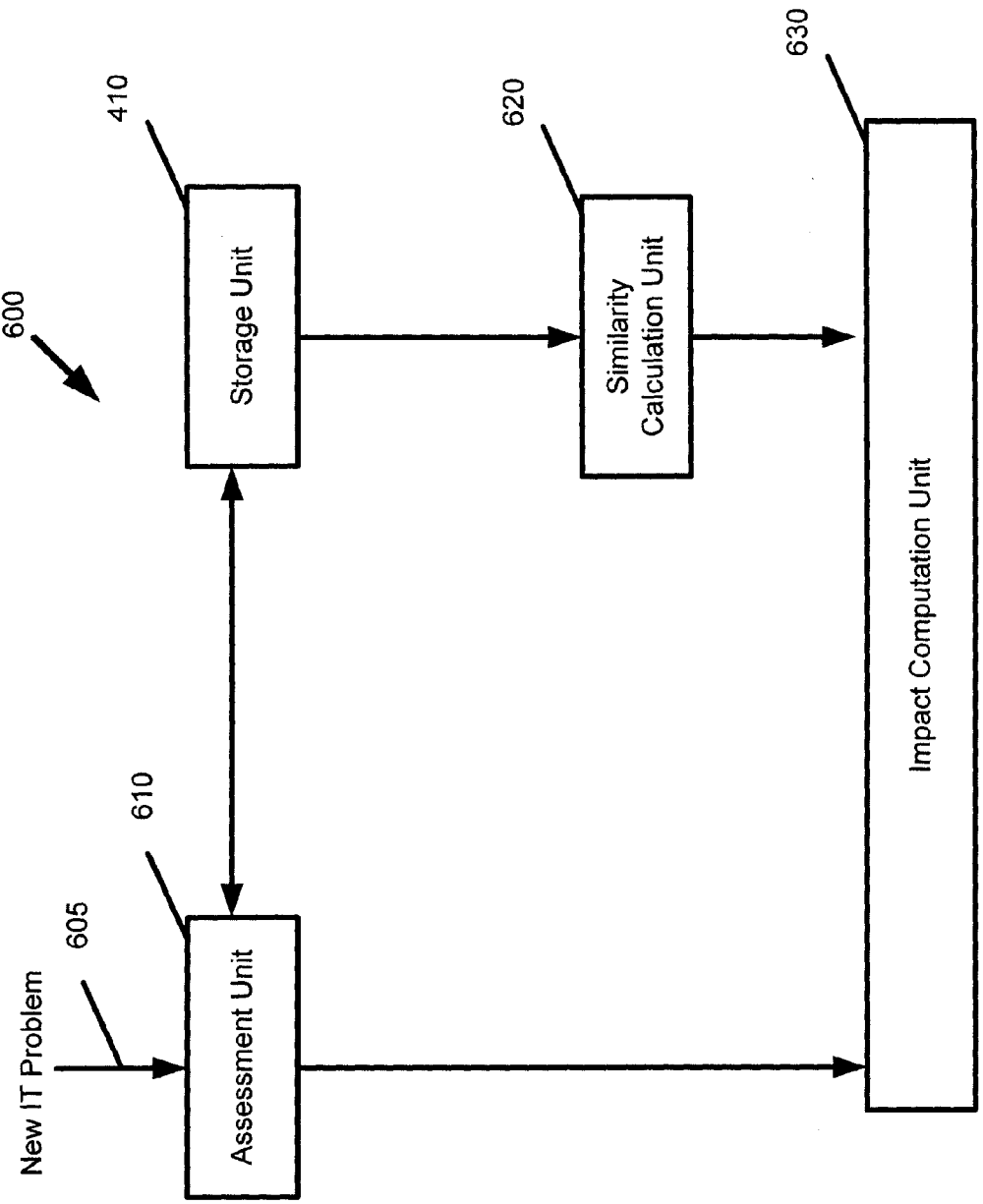
FIG. 10 is a block diagram showing elements making up a decision support system according to the second embodiment.

FIG. 10 shows elements making up an IT change risk assessment system 600 according to the second embodiment. A new IT Problem 605 is provided to an assessment unit 610, whereby the assessment unit 610 accesses information stored in the storage unit 410 to assess what changes may be the cause of the IT problem. The assessment unit 610 calculates a correlation for all pairs of change and problems that exist in the service management historical data stored in the storage unit 410. A similarity calculation unit 620 measures a similarity between each respective pair of changes stored in the storage unit 410. An impact computation unit 630 receives inputs from the assessment unit 610 and the similarity calculation unit 620, and computes an impact of an IT problem as the sum of the impacts of its associated incidents.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. The spirit and scope of the invention are indicated by the following claims.

What is claimed is:

1. A method for assessing a request for change, comprising:
    receiving the request for change;
    employing a computer to compare the request for change with a plurality of stored requests for change that are stored in a change database;
    computing, by the computer executing a similarity calculator using similarity functions, a similarity value for each of the stored requests for change with respect to the received request for change;
    receiving feedback with respect to the similarity values;
    updating a training set of data based on the received feedback;
    applying the updated training set of data to a learning process, to obtain learned similarity functions; and
    updating the similarity calculator based on the learned similarity functions.

2. The method according to claim 1, further comprising:
    displaying, on a display, the similarity values in a hierarchical manner.

3. The method according to claim 2, wherein only the similarity values that exceed a predetermined threshold value are displayed on the display.

4. The method according to claim 2, wherein only first through nth of the similarity values that have the highest values are displayed on the display, n being an integer value greater than 1.

5. The method according to claim 1, wherein the computing step compares attributes associated with the received request for change and attributes associated with each of the stored requests for change.

6. The method according to claim 1, wherein the request for change is a request for an IT change.

7. The method according to claim 5, wherein the request for change is a request for a change to either a software application or a hardware component.

8. A system for assessing a request for change, comprising:
    a first input unit implemented in a computer and configured to receive the request for change;
    a change database configured to store a plurality of requests for change that have been previously received by the system;
    a similarity calculator unit implemented in the computer and configured to compare the request for change with the plurality of stored requests for change, and to compute and output, using similarity functions, a similarity value for each of the plurality of stored requests for change with respect to the received request for change;
    a second input unit configured to receive feedback with respect to the similarity values output by the similarity calculator unit;
    an updating unit configured to update a training set of data based on the received feedback; and
    a learning unit configured to apply a learning process to the updated training set of data, and to compute and output learned similarity functions, wherein the similarity calculator unit is updated based on the learned similarity functions.

9. The system according to claim 8, further comprising:
    a display configured to display the similarity values in a hierarchical manner.

10. The system according to claim 9, wherein only the similarity values that exceed a predetermined threshold value are displayed on the display.

11. The system according to claim 9, wherein only first through nth of the similarity values that have the highest values are displayed on the display, n being an integer value greater than 1.

12. The system according to claim 9, wherein the similarity calculator unit compares attributes associated with the received request for change and attributes associated with each of the stored requests for change.

13. The system according to claim 9, wherein the request for change is a request for an IT change.

14. The system according to claim 13, wherein the request for change is a request for a change to either a software application or a hardware component.

15. A method of determining an impact associated with a new change, comprising:
    operating a computer to:
    receive a change to be implemented in a system;
    calculate a correlation $k(c,p)$ for all pairs of: a) the received change, and b) a plurality of pairs of changes and problem records associated therewith that are stored in a storage unit;
    measure a similarity between the received change and each of the stored changes; and
    calculate an impact associated with implementing the change based on the similarities measured.

16. The method according to claim 15, wherein the calculating step correlates the stored problem records corresponding to the stored changes that are most similar to the received change, in determining the impact associated with implementing the received change.

17. The method according to claim 15, wherein measuring a similarity comprises:
    computing a weighted sum of similarities between common attributes of the received change and the problem records stored in the storage unit.

18. The method according to claim 15, further comprising:
    computing the plurality of pairs of changes and problem records to be stored in the storage unit by associating a time when each change was implemented with times when problems occurred in the system after the change was implemented.

19. The method according to claim 18, wherein a decay value is computed based on a time difference, in determining a correlation between a problem and a change that occurred in the past.

20. The method according to claim 15, wherein the change to be implemented corresponds to an IT change.

21. The method according to claim 20, wherein the change to be implemented corresponds to either a change with respect to a software application or a change with respect to a hardware component.

22. A system for determining an impact associated with a new change, comprising:
- a storage unit configured to store a plurality of pairs of changes and problem records associated therewith; and
- a computer comprising:
  - an input unit configured to receive a change to be implemented in the system;
  - a first calculating unit implemented in the computer and configured to calculate a correlation $k(c,p)$ for all pairs of: a) the received change, and b) the plurality of pairs of changes and problem records associated therewith that are stored in the storage unit;
  - a similarity measuring unit configured to measure a similarity between the received change and each of the changes stored in the storage unit; and
  - a second calculating unit configured to calculate an impact associated with implementing the received change based on the similarities measured by the similarity measuring unit.

23. The system according to claim 22, wherein the second calculating unit correlates the stored problem records corresponding to the stored changes that are most similar to the received change, in determining the impact associated with implementing the received change.

24. The system according to claim 22, wherein the similarity measuring unit comprises:
- a third computing unit configured to compute a weighted sum of similarities between common attributes of the received change and the problem records stored in the storage unit.

25. The system according to claim 22, further comprising:
- a similarity computing unit configured to compute the plurality of pairs of changes and problem records to be stored in the storage unit by associating a time when each change was implemented with times when problems occurred in the system after the change was implemented.

26. The system according to claim 25, wherein a decay value is computed by the similarity calculating unit based on a time difference, in determining a correlation between a problem and a change that occurred in the past.

27. The system according to claim 22, wherein the change to be implemented corresponds to an IT change.

28. The system according to claim 27, wherein the change to be implemented corresponds to either a change with respect to a software application or a change with respect to a hardware component.

* * * * *